United States Patent [19]

Odaka

[11] Patent Number: 5,471,263
[45] Date of Patent: Nov. 28, 1995

[54] METHOD FOR RECORDING A DIGITAL AUDIO SIGNAL ON A MOTION PICTURE FILM AND A MOTION PICTURE FILM HAVING DIGITAL SOUNDTRACKS

[75] Inventor: Kentaro Odaka, Tokyo, Japan

[73] Assignee: Sony Corporation, Japan

[21] Appl. No.: 958,664

[22] Filed: Oct. 8, 1992

[30] Foreign Application Priority Data

Oct. 14, 1991 [JP] Japan .................. 3-265001

[51] Int. Cl.$^6$ .................. G03B 31/02
[52] U.S. Cl. .................. 352/27; 352/37
[58] Field of Search .................. 352/1, 5, 8, 11, 352/26, 27, 37; 360/3, 32, 53, 48

[56] References Cited

U.S. PATENT DOCUMENTS

| | | | |
|---|---|---|---|
| 4,622,598 | 11/1986 | Doi et al. | 360/32 |
| 4,697,212 | 9/1987 | Osawa et al. | 360/48 |
| 5,113,293 | 5/1992 | Endo et al. | 360/32 |
| 5,155,510 | 10/1992 | Beard | 352/27 |
| 5,327,182 | 7/1994 | Kohut et al. | 352/27 |

FOREIGN PATENT DOCUMENTS

| | | |
|---|---|---|
| 0040188A1 | 11/1981 | European Pat. Off. . |
| 0188627A1 | 7/1986 | European Pat. Off. . |
| 0191410A3 | 8/1986 | European Pat. Off. . |
| 0349325A2 | 1/1990 | European Pat. Off. . |
| 9116709 | 1/1991 | WIPO . |
| 9105335 | 4/1991 | WIPO . |

OTHER PUBLICATIONS

SMPTE Journal, vol. 99, No. 11, Nov. 1990, Scarsdale, N.Y., USA, pp. 899–908; Wiles et al.; "Digital optical sound on 35mm motion–picture film."

Primary Examiner—Michael L. Gellner
Assistant Examiner—Eddie C. Lee
Attorney, Agent, or Firm—Limbach & Limbach; Ian Hardcastle

[57] ABSTRACT

Digital audio signals and a conventional audio track are recorded on a motion picture film by error correction encoding digital audio data to be recorded on the film, sequentially arranging the error encoded digital audio data in a direction perpendicular to the direction of advancement of the film by utilizing two areas or more of an area in the vicinity of one end of the film which is parallel with the other end of the film and which is laid between it and one end portion of an analog sound track or an area near the other end of the analog sound track, and recording the same.

26 Claims, 10 Drawing Sheets

F I G. 3
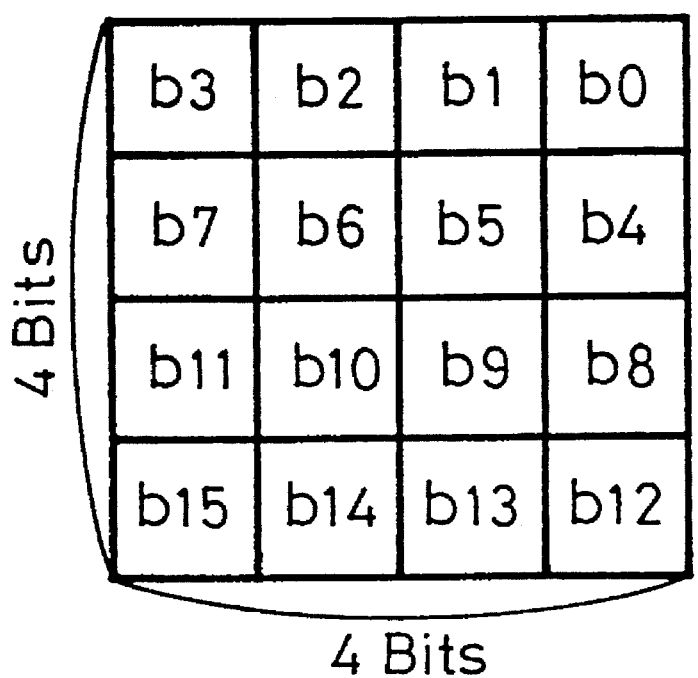

METHOD FOR RECORDING A DIGITAL AUDIO SIGNAL ON A MOTION PICTURE FILM AND A MOTION PICTURE FILM HAVING DIGITAL SOUNDTRACKS

BACKGROUND OF THE INVENTION

Field of the Invention

The present invention relates to a digital audio signal recording method suitably applied to the case such that an audio signal is recorded on an audio track of a motion picture film in a digital fashion.

Description of the Related Art

In motion picture films, an analog audio signal of about two channels is recorded on a so-called sound track which is formed in the vicinity of the picture area.

According to the recent progress in digital audio technologies, it can be known that an audio signal is converted into digital data and then recorded on a recording medium such as a magnetic tape or the like. Also in the motion picture films it has been requested that the audio signal be recorded on the motion picture film in the form of a digital signal.

In the case of motion picture film, however, the conventional sound track on which the analog audio signal is recorded cannot be removed to maintain compatibility with existing film projection apparatus. Therefore, a new track on which digital audio data can be recorded must be prepared in other portion than the sound track.

U.S. Pat. No. 4,600,280 describes a technique in which a digital audio signal is recorded on a motion picture film together with a conventional sound track. Also, U.S. Pat. No. 5,101,397 describes a technique in which an audio signal is recorded in the form of digital audio signal. Furthermore, U.S. Pat. No. 4,461,552 describes a technique in which an audio signal is encoded according to the pulse-code-modulation (PCM) system and then optically recorded on a film. However, the above-mentioned prior art fail to disclose an arrangement in which the words forming a digital audio signal are properly arranged on the film or the addition and arrangement of error detection and/or error correction for avoiding data error.

OBJECTS AND SUMMARY OF THE INVENTION

Therefore, it is an object of the present invention to provide a method for recording a digital audio signal on a motion picture film in which the above-stated shortcomings and disadvantages of the prior art can be eliminated.

More specifically, it is an object of the present invention to provide a method for recording a digital audio signal on a motion picture film in which, when a digital audio signal is optically recorded on a motion picture film or the like, the digital audio signal is separately recorded in plural digital soundtracks so that a large amount of digital data can be recorded.

It is another object of the present invention to provide a method for recording a digital audio signal on a motion picture film in which digital audio signal is encoded to include error-detection and/or error-correction codes and then recorded so that signal errors can be avoided.

Accordingly, the present invention provides a method for recording a digital audio signal on a motion picture film. The digital audio signal is recorded in addition to a conventional analog soundtrack. According to the method, error correction code is added to the digital audio signal to provide a coded digital audio signal. The coded digital audio signal is sequentially arranged into rows. The coded digital audio signal arranged into rows is recorded on the motion picture film in two digital soundtracks. Each row is recorded in each digital soundtrack in a direction perpendicular to the direction of travel. Successive rows are recorded in the direction of travel of travel of the film. One of the digital soundtracks is located near one edge of the motion picture film. The other digital soundtrack is located near the other edge of the motion picture film in one of two positions. The first position is between the other edge of the film and one edge of the analog sound track; the second position is near the other edge of the analog sound track.

The invention also provides a motion picture film with digital and analog sound tracks. The motion picture film comprises a picture area, an analog sound track, and first and second digital soundtracks. The first and second digital soundtracks are located on the motion picture film and run in the direction of travel of the motion picture film. The second digital soundtrack is located on the motion picture film in one of two positions. The first position is between one edge of the picture area and one edge of the analog soundtrack. The second position is near the other edge of the analog sound track. The first digital soundtrack is located near the other edge of the picture area. Recorded in the digital soundtracks is a coded digital audio signal comprising a digital audio signal to which error correction code has been added. The coded digital audio signal is sequentially arranged into rows, and successive rows are recorded in the digital soundtracks in the direction of travel.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, wherein:

FIG. 3 is an explanatory diagram showing a structure of one word of the digital soundtrack according to the present invention;

FIG. 8 is a diagram used to explain how to generate Q parity words in the digital soundtrack according to the present invention;

DETAILED DESCRIPTION OF THE PREFERRED EMBODIMENTS

Embodiments of the present invention will hereinafter be described with reference to FIGS. 1 through 10.

Figure 1:
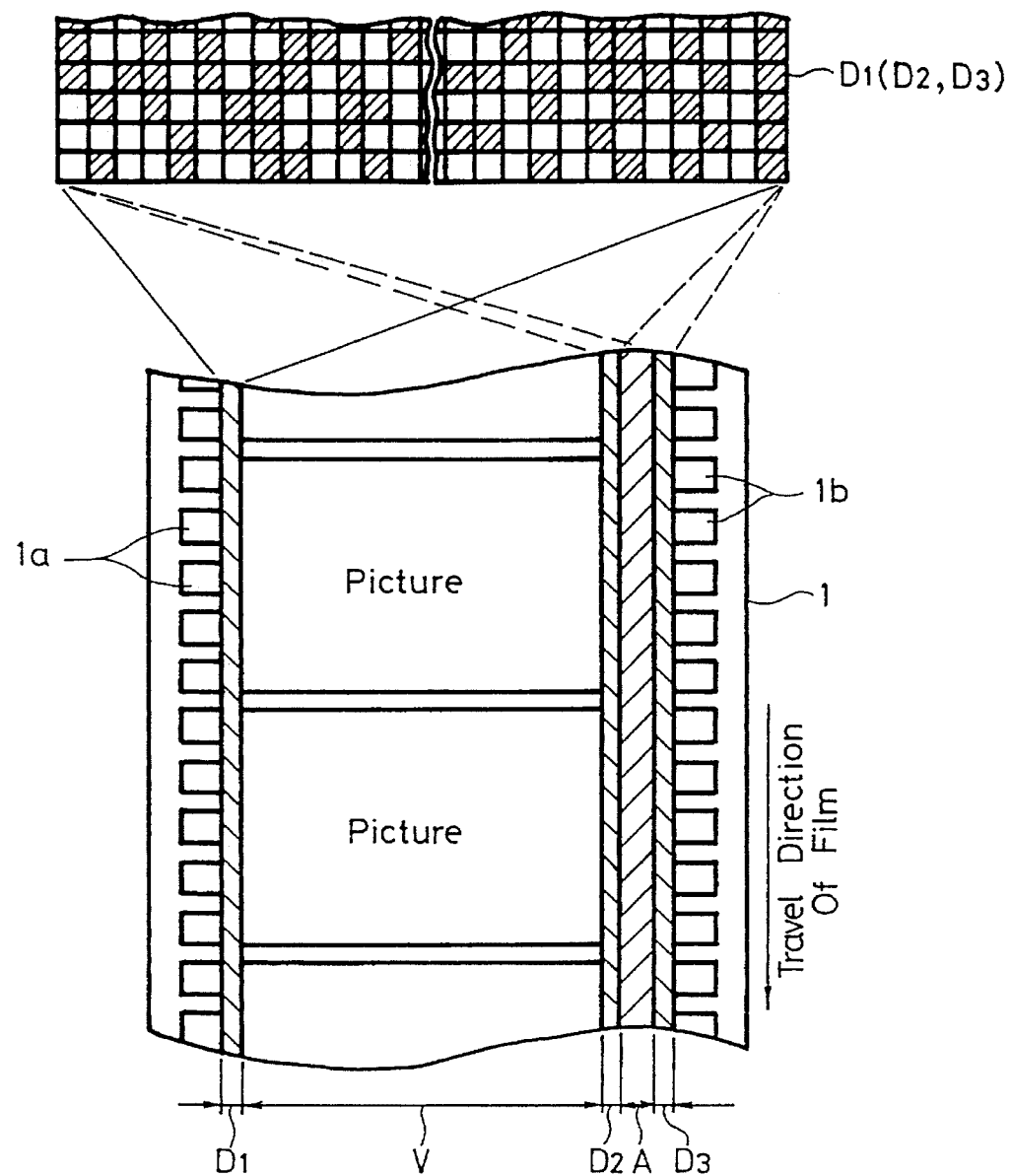
FIG. 1 illustrates the format of the digital soundtrack according to the present invention.

FIG. 1 of the accompanying drawings shows a track format in which a digital audio signal is recorded on a motion picture film. As shown in FIG. 1, the picture area V is formed on substantially a central portion of a motion picture film 1. An analog soundtrack A is formed at one end edge of the picture area V. An analog audio signal is optically recorded on the analog soundtrack A. Perforations 1a, 1b are formed on both end edge portions of the motion picture film 1 at a predetermined interval. A first digital soundtrack D1 is formed on the motion picture film 1 between the perforations 1a and the picture area V. A second digital soundtrack D2 is formed on the motion picture film 1 between the picture area V and the analog soundtrack A. A third digital soundtrack D3 is formed on the motion picture film 1 between the analog audio track A and the other perforations 1b.

In this embodiment, assuming that the width of the motion picture film 1, for example, is 35 mm, then the width of the first digital soundtrack D1 is 425 μm, the width of the second digital soundtrack D2 is 660 μm and the width of the third digital soundtrack D3 is 410 μm.

A predetermined number of words of a digital audio signal is separately recorded on the respective digital soundtracks D1 to D3. The respective soundtracks D1 to D3 include tracks corresponding to the respective words of the digital audio signal. White or black patterns are exposed on the respective digital soundtracks in response to bits of the respective words to record the digital audio signal.

Figure 2:
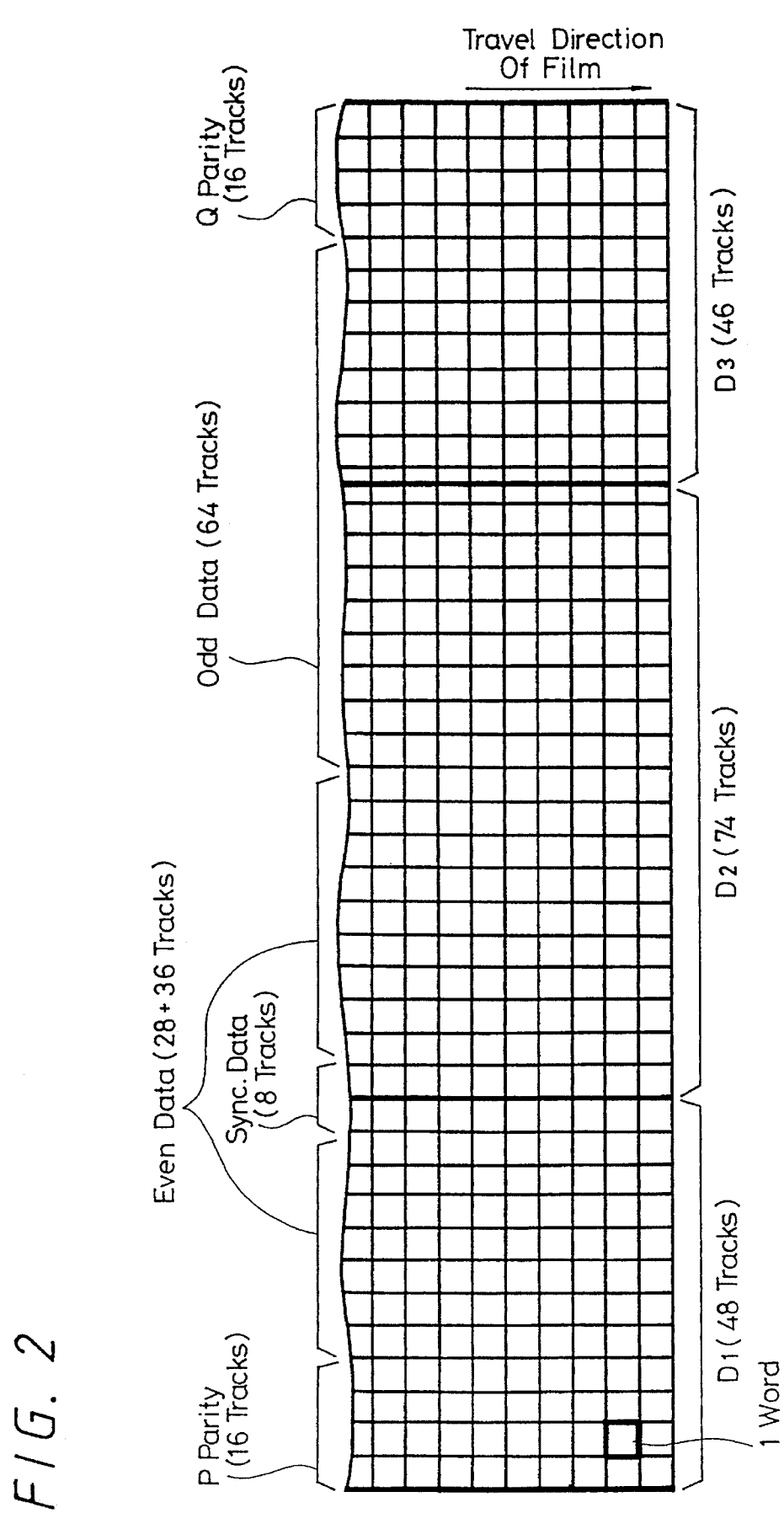
FIG. 2 is an explanatory diagram showing a structure of the digital audio soundtrack according to the present invention.

FIG. 2 of the accompanying drawings shows the respective soundtracks D1 to D3 that are located close to each other in order to understand more clearly the whole arrangement of the digital audio signal separately arranged on the first to third digital soundtrack D1 to D3. In FIG. 2, a square represents one word of the digital audio signal. In this embodiment, each word is composed of 16 bits arranged into 4 bits×4 tracks. Accordingly, there are formed tracks corresponding to respective bits. In this embodiment, there are formed 168 tracks in total in the direction perpendicular to the direction of travel of the motion picture film, i.e., the direction in which the motion picture film 1 is transported.

FIG. 3 of the accompanying drawings shows a structure of the above-mentioned one word. As shown in FIG. 3, one word comprises 4 bits in the longitudinal direction and 4 bits in the lateral direction, i.e., 16 bits in total. In one word of the digital audio signal bits, $b_{15}$ (MSB) to $b_0$ (LSB) of the 16-bit word are arranged as shown in FIG. 3.

In FIG. 2, the first digital soundtrack D1 is composed of 48 tracks (12 words). The second digital soundtrack D2 is composed of 74 tracks (18.5 words). The third digital soundtrack D3 is composed of 46 tracks (11.5 words). Accordingly, in the digital soundtracks D1, D2 and D3, 48 bits, 74 bits and 46 bits are respectively arranged in the lateral direction perpendicular to the direction of travel of the motion picture film 1. According to the above track format, bit occupies a square region, one side of which is about 9 μm and one word occupies a square, one side of which is about 36 μm.

As shown in FIG. 2, on the 16 tracks (4 words) closest the left edge of the first digital soundtrack D1, there is recorded a first parity (P parity) word that is used to detect and/or correct error in the digital audio data. Audio data is recorded on the next 28 tracks and synchronizing (sync.) data is recorded on the next 4 tracks (one word).

Sync. data is also recorded on the 4 tracks (one word) closest to the left edge of the second digital soundtrack D2. The audio signal is recorded on the next 70 tracks (17.5 words).

On the 30 tracks (7.5 words) closest to the left edge of the third digital soundtrack D3, there is recorded the audio signal. A second parity (Q parity) word that is used to detect and/or correct error in digital audio signal is recorded on the remaining 16 tracks (4 words).

In this embodiment, the sync. data recorded at the right edge portion of the recording track D1 and the left edge portion of the soundtrack D2, has a constant bit pattern which is used to detect the positions of the soundtracks D1 and D2. That is, as shown in FIG. 1, the picture area V is located between the first and second digital soundtracks D1 and D2 and these recording tracks D1, D2 are thereby spaced apart. Therefore, the sync. data are respectively recorded on the first and second soundtracks D1, D2 so as to facilitate the reproduction of the digital audio signal. Incidentally, since the gap between the second and third digital soundtrack D2 and D3 is relatively small, the signal recorded on the third digital soundtrack D3 can easily be reproduced using the sync. data recorded on the second digital soundtrack D2.

With this arrangement a digital audio signal representing 8 channels can be recorded on the motion picture film 1. The format for recording an 8-channel digital audio signal will be described with reference to FIGS. 4 and 5.

Figure 4:
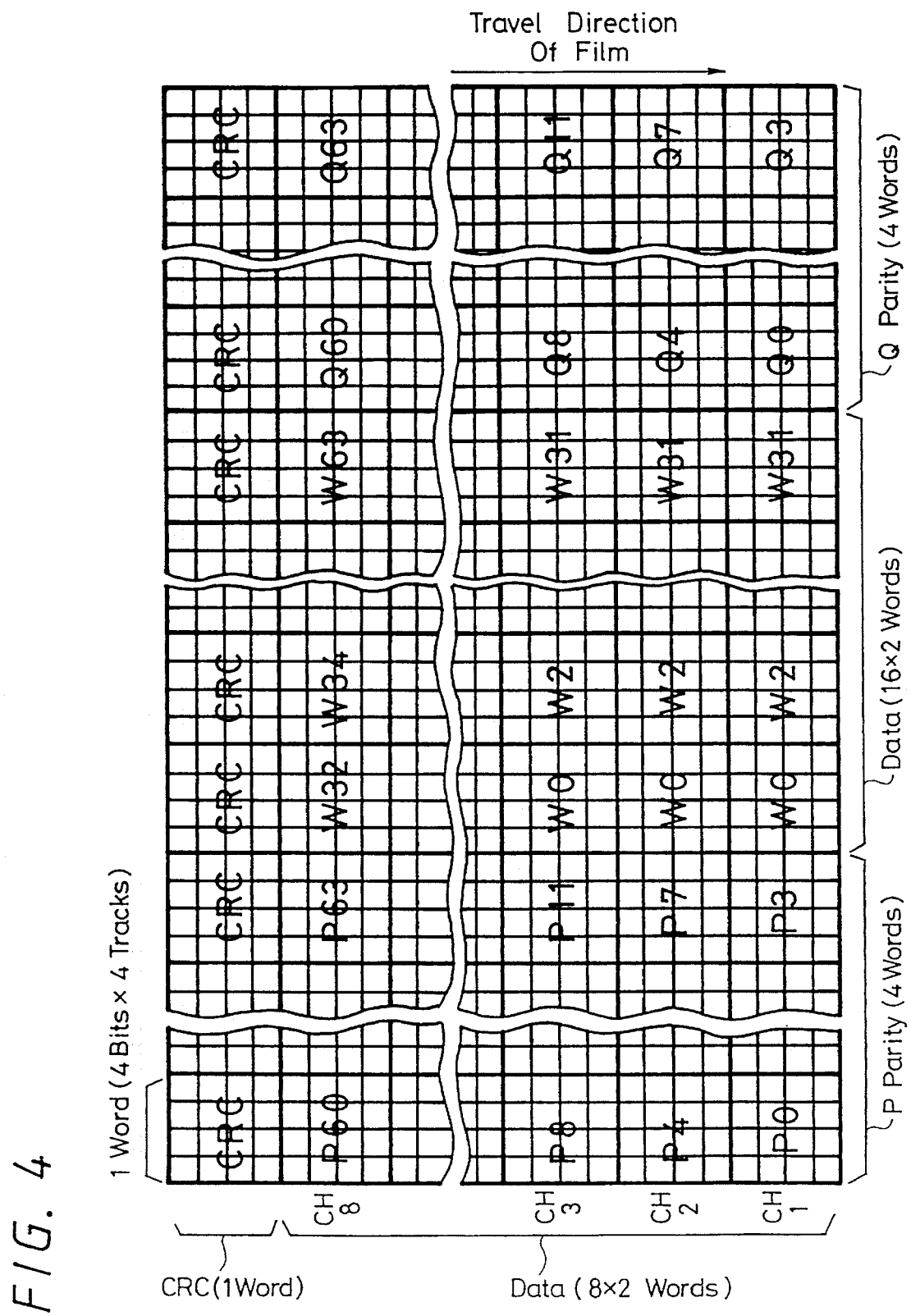
FIG. 4 is a diagram showing the data format in plural channels according to the present invention.

FIG. 4 of the accompanying drawings shows the channel signals of the respective channels at the unit of bits (sync. data is not shown).

Figure 5:
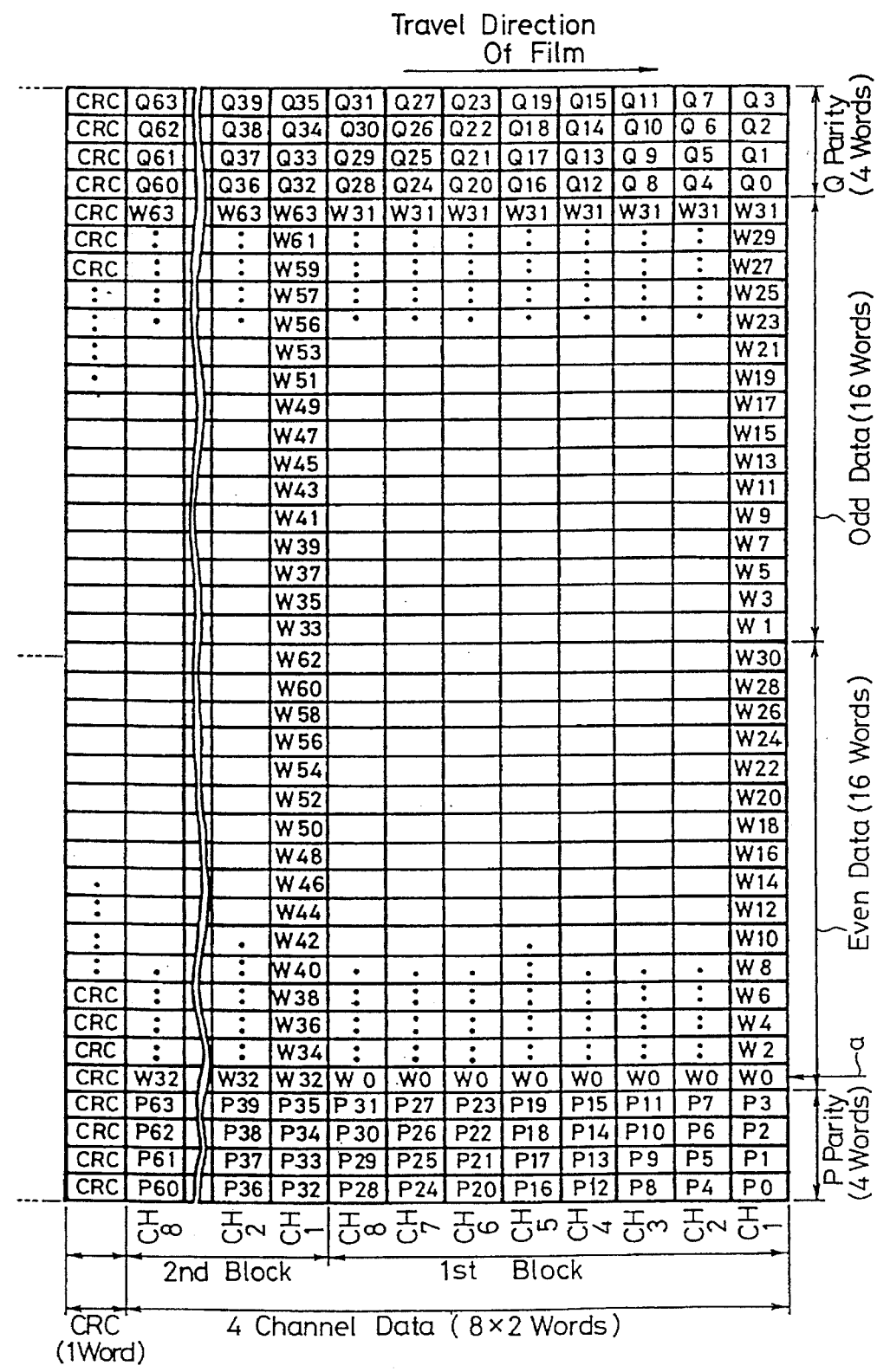
FIG. 5 is a diagram used to explain the location of respective words according to the present invention.

FIG. 5 of the accompanying drawings shows the channel signals of the on respective channels at the unit of words (sync. data is not shown).

In this embodiment, as shown in FIGS. 4 and 5, the channel signal of 8 channels are sequentially recorded on the digital soundtracks, with the channel signal of each channel successively arranged in the lateral direction (shown horizontally in FIGS. 4 and 5), perpendicular to the direction of travel of the motion picture film 1. The word sequence in the lateral direction and shown on the lowermost end of FIG. 5 shows the digital audio signal of the first channel. In this word sequence, from the left end thereof, there are recorded 4P parity words (P0, P1, P2, P3, of 4 words, in that order. Subsequently, data (W0, W1, . . . , W31) of 32 words (32 samples) which construct the first channel (CH1) are recorded and are further followed by 4Q parity words (Q0, Q1, Q2, Q3). The 32 words (W0 to W31) are recorded in a so-called interleave recording fashion so that the even words (W0, W2, . . . , W30) and the odd words (W1, W3, . . . , W31) are separated. Therefore, from the left edge of the soundtrack, there are recorded the even words (W0, W2, . . . , W30) and odd words (W1, W3, . . . , W31) sequentially in that order.

In FIG. 5, there are provided the P parity words (P0, P1, P2, P3) which are used to error-detect and/or error-correct data sequence located in the lateral direction. Also, in FIG. 5, there are provided the Q parity words (Q0, Q1, Q2, Q4) which are used to error-detect and error-correct data sequence located in the oblique direction of data that are arranged in a two-dimensional array with respect to the direction of travel the motion picture film 1 and the direction perpendicular to the direction of travel of the motion picture film 1. How to generate the P and Q parity words will be described in detail later on.

On the second channel, there are recorded 32 words of the first channel signal (W0, W1, W1), 4P parity words (P4 to P7) and 4Q parity words (Q4 to Q7) similarly to the first channel. Also in this case, the data (W0 to W31) are interleaved to words of even words and odd words and then recorded. In a like manner, 32 words of channel signal (W0 to W31), P parity words and Q parity words are respectively recorded up to the eighth channel.

In the next word sequence of the lateral direction which follows the word sequence of the eighth channel (CH8), there are recorded 32 words of the channel signal (W32, W33, ..., W63), 4P parity words (P32 to P35) and 4Q parity words (Q32 to Q35) constructing the first channel (CH1) thereof. The 32 words of the first channel signal (W32 to W63) continue to the word sequence (W0 to W31) of the above first channel CH1. Also in this case, words (W32 to W63) are interleaved into even words and data of odd words and then recorded. Similarly, 32 words of the channel signal (W32 to W63) are recorded together with P and Q parity words up to the eighth channel (CH8).

Error detection codes formed of CRC (cyclic redundancy check) codes are generated and recorded after two blocks of one signal block from the first channel (CH1) to the eighth channel (CH8) located in the lateral direction. In this case, the CRC codes are generated to and added to the respective tracks which are formed along the travel direction of the motion picture film 1.

Figure 6:
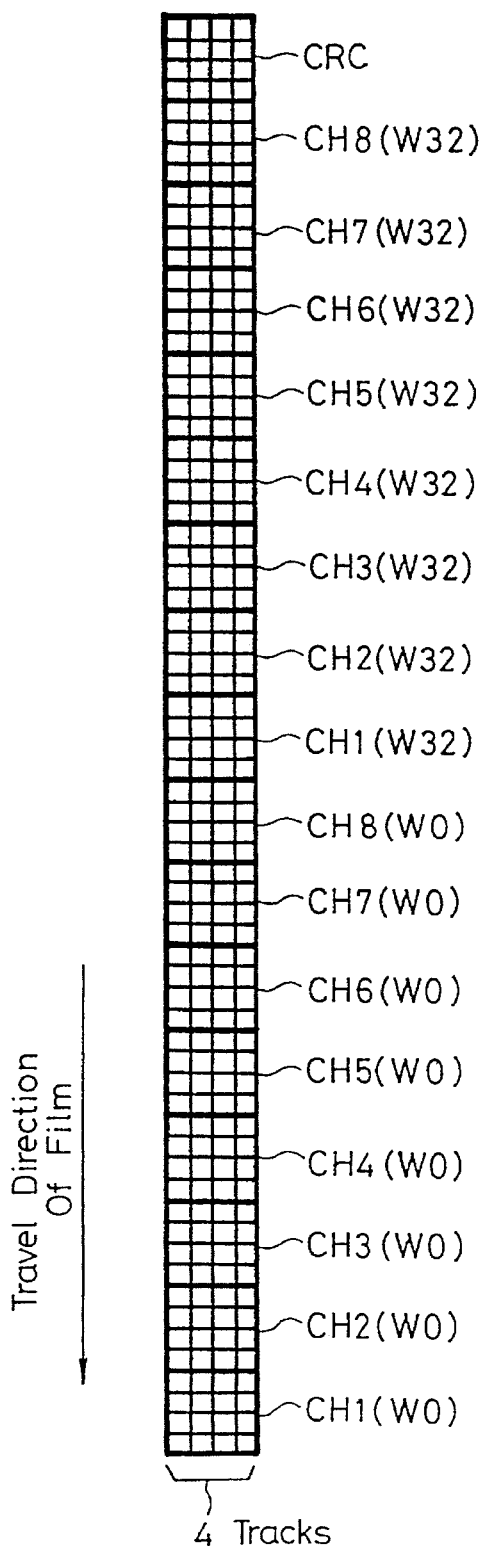
FIG. 6 is a diagram used to explain the location of CRC code in the digital soundtrack according to the present invention.

FIG. 6 of the accompanying drawings shows the condition such that the CRC code is added to respective words located in the direction shown by an arrow $\underline{a}$ in FIG. 5.

As shown in FIG. 6, one word is composed of 4 tracks. The CRC code is generated to and added to 16 words which comprise words W0 of 8 channels from the first channel (CH1) to the eighth channel (CH8) constructing the first signal block and words (W32) of 8 channels from the first channel (CH1) to the eighth channel (CH8) constructing the second signal block.

The first signal block, the second signal block, and the CRC code are repeatedly and sequentially recorded in response to the travel of the motion picture film 1.

Figure 7:
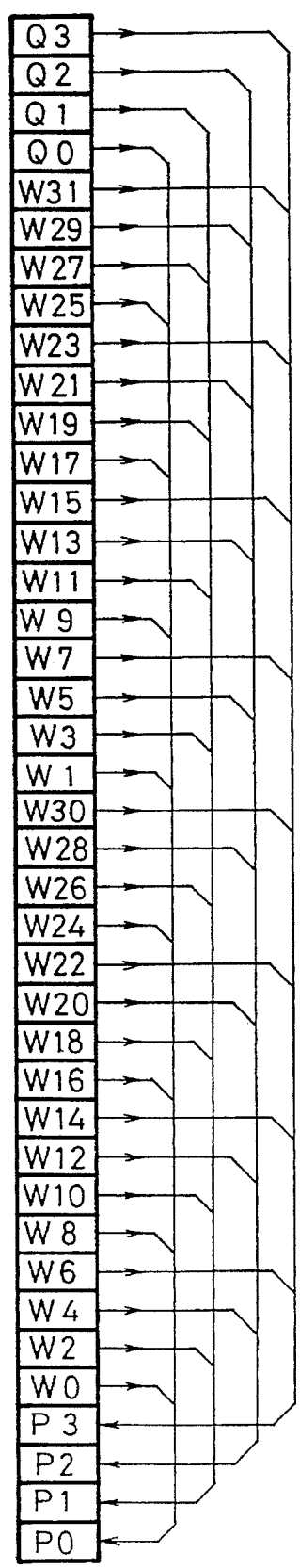
FIG. 7 is a diagram used to explain how to generate P parity words in the digital soundtrack according to the present invention.

How to generate and add the P parity words will be described with reference to FIG. 7, FIG. 7 of the accompanying drawings shows one word sequence in the lateral direction shown in FIG. 5. As shown in FIG. 7, the P parity word P0 is generated from the words W0, W8, W16, W24, W1, W9, W17, W25, which are arranged at every four words and the Q parity word Q0.

Similarly, the P parity word P1 is generated on the basis of data W2, W10, W18, W26, W11, W19, W27, which are arranged at every four words, and the Q parity word Q1. The P parity words P2, P3 are similarly generated on the basis of the word sequence in which words are arranged at every four words.

How to generate the Q parity words (Q0, Q1, Q2, Q3) will be described with reference to FIG. 8.

Figure 8:
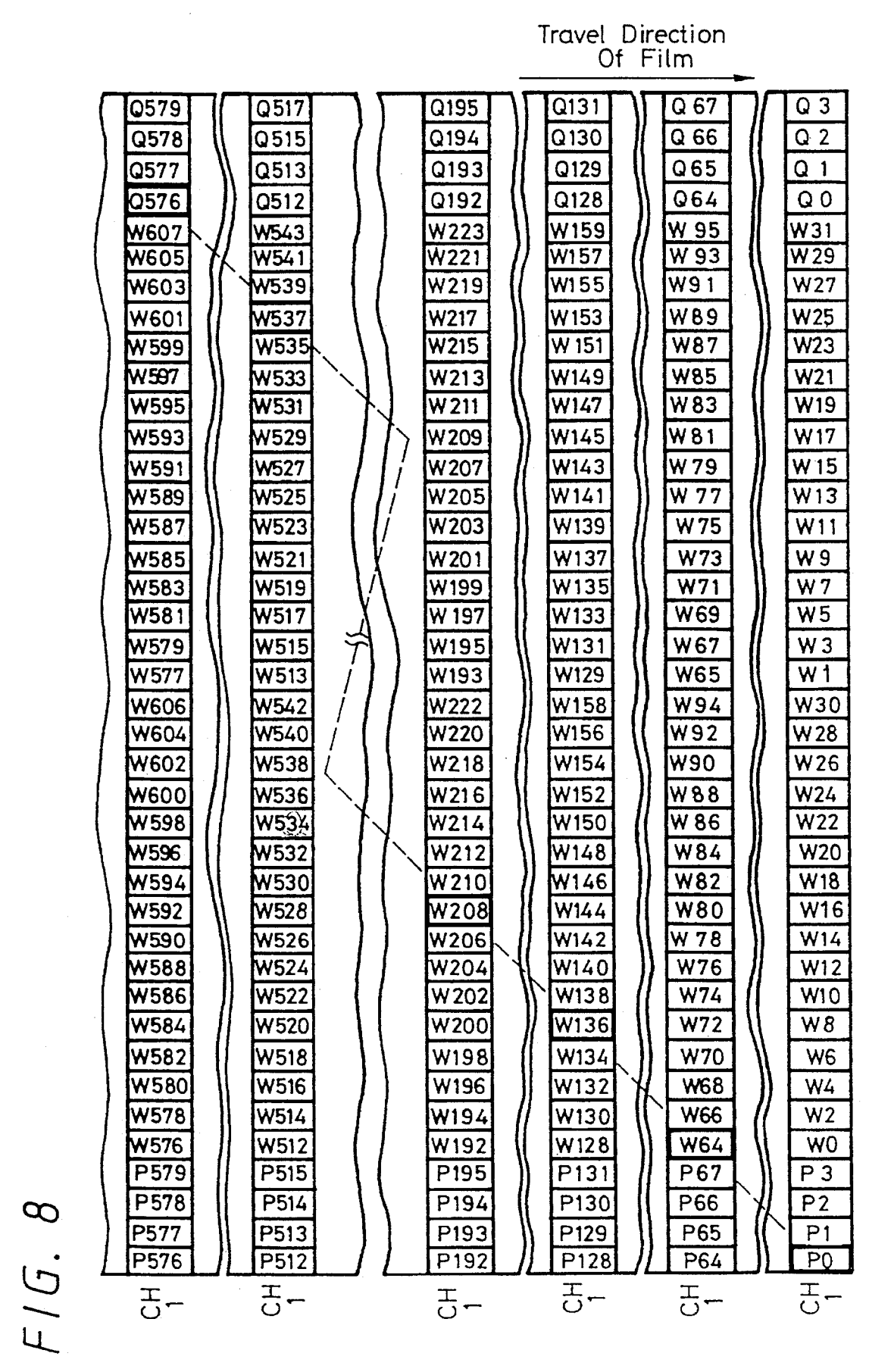

FIG. 8 of the accompanying drawings shows only the word sequences of the lateral direction in which channel signals of the first channels (CH1) is recorded. As shown in FIG. 8, this word sequence comprises a word sequence in which words W0 to W31 of the first channel (CH1) are recorded, a word sequence in which words W64 to W95 of the first channel are recorded, a word sequence in which words W128 to W159 of the first channel CH1 are recorded,
...

Considering the Q parity word 576 within Q parity words 576 to 579 added to the word sequence of the lateral direction in which words W576 to W607 of the first channel CH1 are recorded, it is seen that the Q parity word 576 is generated on the basis of 9 words which are composed of the P parity word P0, words W64, words W208, ..., words W537 indicated by the broken line in FIG. 8. Other Q parity words are similarly generated and then interleaved.

Equations for generating the P parity words and the Q parity words will be described below.

$$P_{4(l-1)+32m+n} = W_{l,32m+2n} + W_{l,32m+2n+1} +$$
$$W_{l,32m+2n+8} + W_{l,32m+2n+9} + W_{l,32m+2n+16} + W_{l,32m+2n+17} +$$
$$W_{l,32m+2n+24} + W_{l,32m+2n+25}$$

$$Q_{4(l-1)+32m+n+576} = P_{4(l-1)+32m+n} +$$
$$W_{l,32m+2n+64} + W_{l,32m+2n+136} + W_{l,32m+2n+208} +$$
$$W_{l,32m+2n+280} + W_{l,32m+2n+321} +$$
$$W_{l,32m+2n+293} + W_{l,32m+2n+465} + W_{l,32m+2n+537}$$

where X in $P_x$, $Q_x$ indicates the word number, X in $W_x$ indicates the channel number at which the word is located, Y depicts the word number, l depict the channel numbers 1 to 8, m indicates the integers from 0 to infinity and n indicates 0, 1, 2 and 3.

In this way, a digital audio signal of 8 channels is divided, arranged and then optically recorded on the digital soundtracks D1, D2 and D3.

Figure 9:
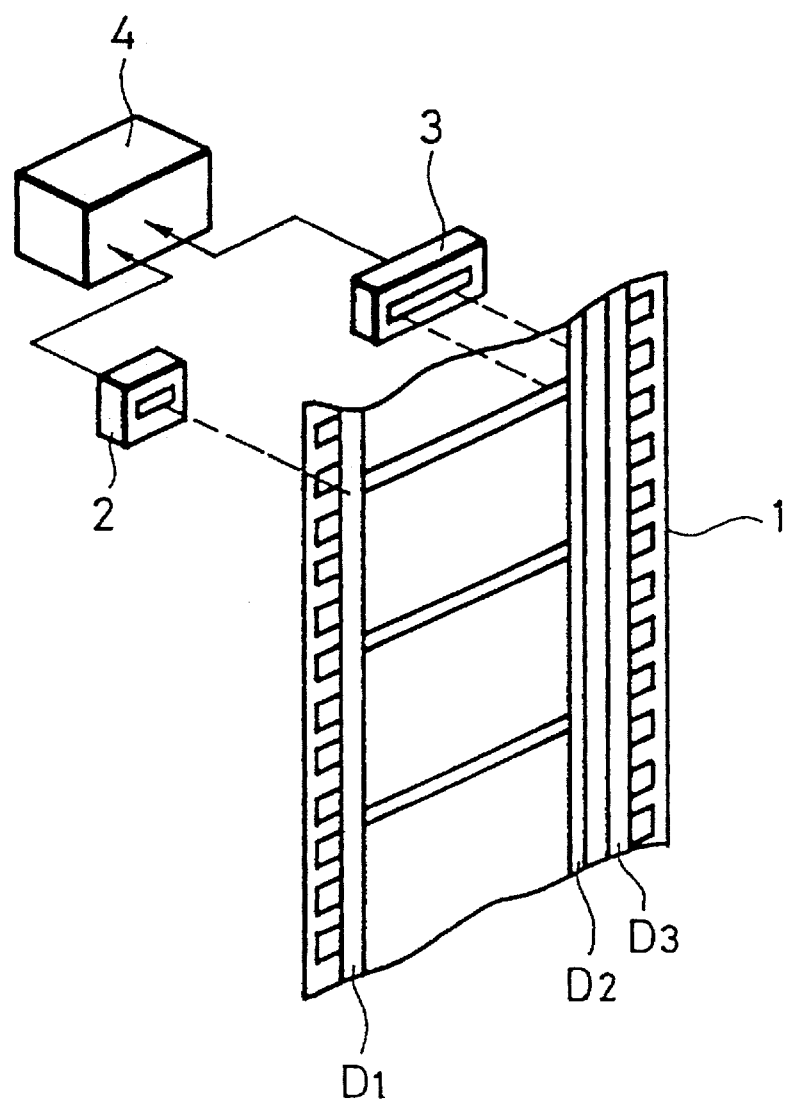
FIG. 9 is a diagram showing an arrangement of a reproducing apparatus for reproducing the digital soundtrack according to the present invention.

FIG. 9 of the accompanying drawings shows an arrangement of a reproducing apparatus that reproduces the digital audio signal recorded on the recording tracks D1, D2 and D3 of the motion picture film 1.

As shown in FIG. 9, first and second CCD (charge-coupled device) line sensors 2 and 3 are disposed within the transport system of the motion picture film 1. The first CCD line sensor 2 is disposed at the position corresponding to the first digital soundtrack D1 and the second CCD line sensor 3 is disposed at the position corresponding to the second and third digital soundtrack D2 and D3. That is, since the second digital soundtrack D2 and the third digital soundtrack D3 are disposed close to each other, the digital audio signal recorded thereon can be detected by one CCD line sensor 3. The digital audio signals recorded in the respective tracks detected by the respective CCD line sensors 2 and 3 are supplied to the digital signal processor apparatus 4. In this digital data processor apparatus 4, the digital audio signal, recorded on the motion picture film 1, is reproduced on the basis of sync. data and the digital audio signal is error-detected and/or error-corrected on the basis of the P parity words, Q parity words and CRC codes, thereby reproducing the digital audio signals of 8 channels. In this embodiment, the error detection is carried out mainly by the CRC codes.

Since each word formed of 16 bits and relating to the error-detection and error-correction is recorded on the motion picture film 1 in a square configuration of 4 bits each in the longitudinal and lateral directions, the error rate of erroneous data caused by a scratch in the longitudinal direction of the film is reduced to ¼, as compared with the case in which each word formed of 16 bits is linearly arrayed on one track. Similarly, compared with the case in which each word of 16 bits in linearly arrayed over the 16 tracks, the error rate of erroneous data caused by a scratch in the width direction of the film is minimized. Further, since even words and odd words are interleaved, data can be interpolated with ease.

In addition, each track of the P parity words is generated along the lateral direction of the film so that, even when a portion of the film is removed and the film is spliced during editing the error correction can be carried out on the basis of at least the P parity words. Thus, error correction can still be carried out in the vicinity of a splice in the film. Further, since the Q parity words are interleaved over a long period of time and are then generated in the longitudinal direction of the film, powerful error correction can be made.

Figure 10:
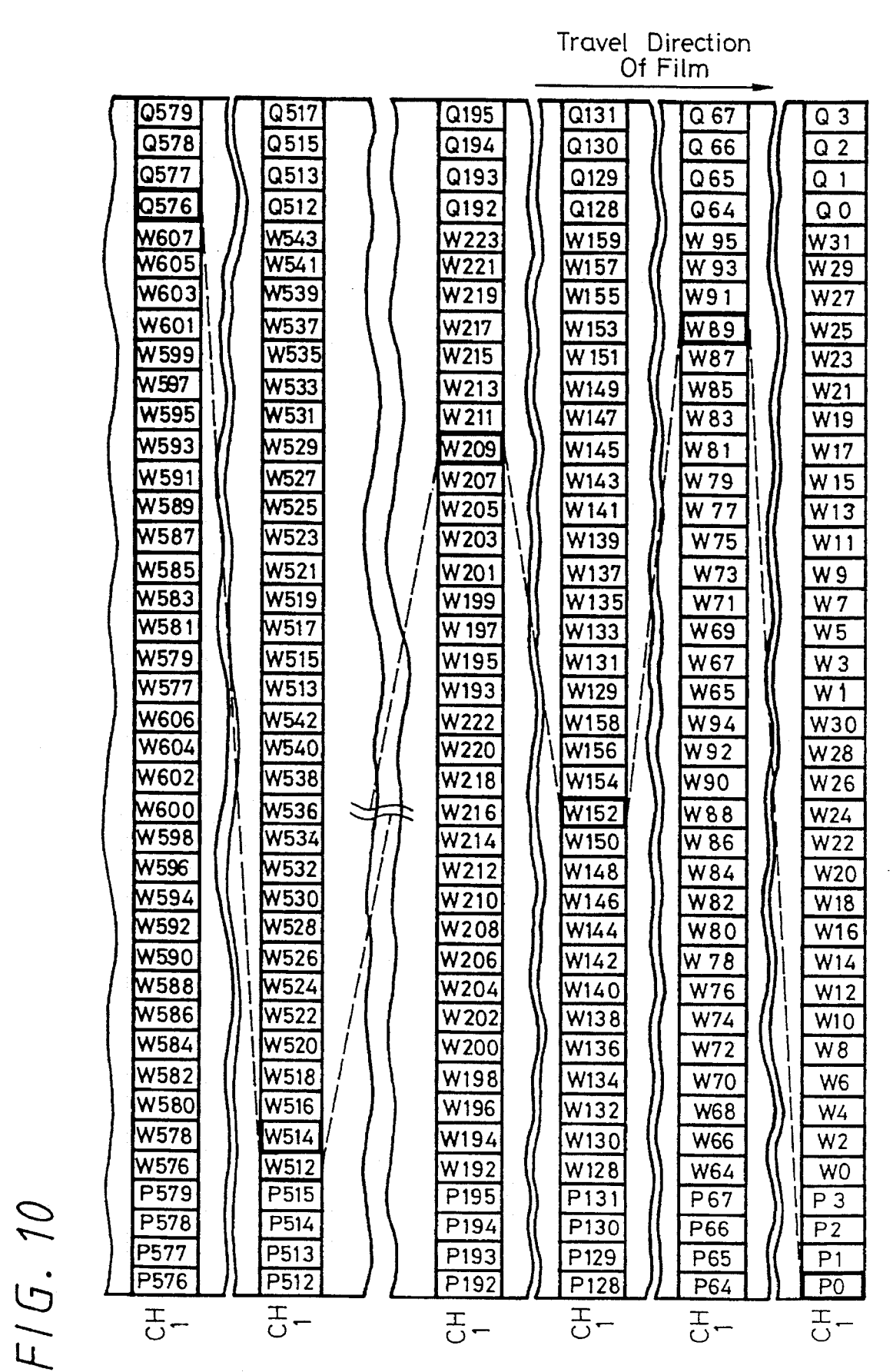
FIG. 10 is a diagram used to explain how to generate Q parity words in a different embodiment of the digital soundtrack according to the present invention.

While the tracks in which are of words used to generate the Q parity words are sequentially displaced to the right in accordance with the word sequences of the lateral direction according to the embodiment shown in FIG. 8, the present invention is not limited thereto and tracks in which the words used to generate the Q parity words may be alternately displaced right and left in a zigzag fashion as shown by broken lines in FIG. 10. According to this technique, data can be interleaved in a more complex fashion, thereby making it possible to perform more powerful error correction.

While each word is arranged in a two-dimensional array as in 4 bits×4 bits and then recorded as described above, words need not be arranged in a square fashion. However, if words are recorded in a two-dimensional array substantially similar to the square, then any errors caused by scratches in the longitudinal and horizontal directions can be corrected satisfactorily as described above.

Further, while the digital audio signals of 8 channels are dispersed and recorded on a number of tracks, i.e., 160 tracks (excepting the tracks for sync. data) as described above, the number of tracks and the number of channels are not limited to those in the above embodiments. As described in the above embodiments, the present invention can achieve remarkable effects when the digital audio signal is recorded on tracks whose number is several 10s of times the number of channels.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for recording a digital audio signal including words on a motion picture film having a direction of travel, the motion picture film including two opposed edges, a picture area, the picture area including two opposed edges parallel to the opposed edges of the motion picture film, and a row of sprocket holes inset from each of the two opposed edges of the motion picture film, the audio signal being recorded in addition to a conventional analog soundtrack formed in the direction of travel, the conventional analog soundtrack having two opposed edges, and being located on the motion picture film between the row of sprocket holes inset from one of the opposed edges of the motion picture film and one of the opposed edges of the picture area, the method comprising steps of:

(a) adding error correction code words to the digital audio signal, the words of the digital audio signal and the error correction code words collectively words of a coded digital audio signal, the words of the coded digital audio signal each including bits;

(b) arraying the bits of each of the words of the coded digital audio in a rectangular array to provide rectangularly-arrayed words;

(c) sequentially arranging the rectangularly-arrayed words of the coded audio signal into rows; and (d) recording each of the rows of the rectangularly-arrayed words of the coded digital audio signal as a row in two digital soundtracks located on the motion picture film outside the picture area and outside the analog soundtrack, one of the digital soundtracks being located between the one of the edges of the picture area further from the analog soundtrack and the row of sprocket holes further from the analog sound track, the other of the digital soundtracks being located between the one of the edges of the analog soundtrack further from the picture area and the row of sprocket holes closer to the analog soundtrack, each of the rows of the rectangularly-arrayed words being recorded in the digital soundtracks in a direction perpendicular to the direction of travel, successive rows being recorded in the direction of travel, such that ones of the bits of each of the rectangularly-arrayed words are arrayed in the direction of travel and others of the bits of each of the rectangularly-arrayed words are in the direction perpendicular to the direction of travel.

2. The method according to claim 1, wherein the step of adding error correction code words to the digital audio signal includes steps of:

generating first parity words; and adding the first parity words to the digital audio signal as the error correction code words.

3. The method according to claim 2, wherein:

in the step of generating first parity words, each of the first parity words is generated in response to selected words of the digital audio signal; and in the step of sequentially arranging the rectangularly-arrayed words of the coded digital audio signal, the selected words and the first parity words are all arranged in one row.

4. The method according to claim 1, wherein the step of adding error correction code words to the digital audio signal includes the steps of:

generating first parity words and second parity words; and adding the first parity words and the second parity words to the digital audio signal as the error correction code words.

5. The method according to claim 4, wherein:

in the step of generating the first parity words and the second parity words:

the first parity words are generated from words including first selected words of the digital audio signal, and the second parity words are generated from words including second selected words of the digital audio signal; and in the step of sequentially arranging the rectangularly-arrayed words of the coded digital audio signal:

the first selected words and the first parity words are all sequentially arranged in one of the rows, the rectangularly-arrayed words of the coded audio signal arranged in successive rows form a two-dimensional array, and the second selected words are arranged on an oblique axis of the two-dimensional array.

6. The method according to claim 5, wherein, in the step of generating the first parity words and the second parity words, the second parity words are additionally generated from the first parity words.

7. The method according to claim 4, wherein, in the step of generating the first parity words and the second parity words, the first parity words are additionally generated from the second parity words.

8. The method according to claim 1, wherein: the digital audio signal includes odd-numbered words and even-numbered words;

in the step of sequentially arranging the rectangularly-arrayed words of the coded digital audio signal:
the words of the digital audio signal arranged into each of the rows are separated into even-numbered words and odd-numbered words, and
the even-numbered words are arranged consecutively in a first half of the row and the even-numbered words are arranged consecutively in a second half of the row.

9. The method according to claim 8, wherein the step of adding error code words to the digital audio signal includes the steps of:

generating first parity words; and adding the first parity words to the digital audio signal as the error correction code words.

10. The method according to claim 8, wherein the step of adding error code to the digital audio signal includes the steps of:

generating first parity words and second parity words; and adding the first parity words and the second parity words to the digital audio signal as the error correction code.

11. The method according to claim 1, wherein:

each digital soundtrack has two opposed edges;

the method additionally comprises the step of adding synchronizing words to the digital audio signal, the synchronizing words additionally constituting words of the coded digital audio signal;

in the step of sequentially arranging the rectangularly-arrayed words of the coded digital audio signal, the synchronizing words are placed in a portion of each row; and in the step of recording each of the rectangularly-arrayed words of the coded digital audio signal, the synchronizing words are recorded as the words closest to one of the edges of at least one of the digital soundtracks.

12. The method according to claim 1, wherein:

in the step of arraying the bits of each of the words of the coded digital audio signal into a rectangular array, the bits of each word are arranged in a rectangular array of m×n bits; and in the step of recording each of the rows of the rectangularly-coded words of the coded digital audio signal as a row in two digital soundtracks, each rectangularly-arrayed word is recorded with m bits in the direction perpendicular to the direction of travel, and with n bits in the direction of travel.

13. The method according to claim 12, wherein each rectangularly-arrayed word is composed of 16 bits, and m is 4 and n is 4.

14. The method according to claim 1, wherein:

the digital audio signal includes signals representing plural channels;

in the step of sequentially arranging the rectangularly-arrayed words of the coded digital audio signal, the rectangularly-arrayed words of the coded audio signal corresponding to the signals representing the respective channels are sequentially arranged in each of the rows; and in the step of recording the rectangularly-arrayed words of the coded digital audio signal, successive rows are recorded in the direction perpendicular to the direction of travel such that rows of rectangularly-arrayed words corresponding to the signals representing the respective channels are cyclically recorded in the direction of travel.

15. The method according to claim 1 wherein:

the step of adding error correction code words to the digital audio signal additionally includes the step of generating an error-detection parity word from selected ones of the words of the digital audio signal as an error correction code to detect errors in the digital audio signal, the error detection parity word additionally constituting words of the coded digital audio signal; and in the step of sequentially arranging the rectangularly-arrayed words of the coded digital audio signal, the error-detection parity word and the selected ones of the words of the digital audio signal wherefrom the error detection code word is generated are arranged in corresponding positions in consecutive rows.

16. The method according to claim 15, wherein, in the step of generating the error-detection parity word, the error-detection parity word is generated using a cyclic redundancy check code.

17. A motion picture film with digital and analog soundtracks, the motion picture film having a direction of travel, and two opposed edges, and comprising:

(a) a row of sprocket holes inset from each of the two opposed edges;

(b) a picture area having two opposed edges;

(c) a conventional analog soundtrack having two opposed edges, the conventional analog soundtrack being located on the motion picture film between the row of sprocket holes inset from one of the opposed edges of the motion picture film and the one of the opposed edges of the picture area closer to the row of sprocket holes;

(d) first and second digital soundtracks located on the motion picture film outside the picture area and outside the analog soundtrack, the first and second digital soundtracks running in the direction of travel, the first of the digital soundtracks being located between the one of the edges of the picture area further from the analog soundtrack and the row of sprocket holes further from the analog soundtrack, the second of the digital soundtracks being located between the one of the edges of the analog soundtrack further from the picture area and the row of sprocket holes closer to the analog soundtrack, the digital soundtracks having recorded therein rectangular arrays of bits disposed in rows in a direction perpendicular to the direction of travel, successive rows of the rectangular arrays of bits being recorded in the direction of travel, each of the rectangular arrays of bits representing one word of a coded digital audio signal comprising words of a digital audio signal whereto error-correction code words have been added.

18. The motion picture film according to claim 17, wherein the error correction code words include first parity words.

19. The motion picture film according to claim 18, wherein:

each first parity word is generated in response to selected words of the digital audio signal; and the rectangular arrays of bits representing the selected words and the first parity words are all recorded in one row.

20. The motion picture film according to claim 17, wherein:

the digital audio signal includes even-numbered words and odd-numbered words; and the rectangular arrays of bits disposed consecutively in a first half of each row represent the even-numbered words, and the rectangular arrays of bits disposed consecutively in a second half of each row represent the odd-numbered words.

21. The motion picture film according to claim 17, wherein:

each digital soundtrack has two opposed edges; and the rectangular arrays of bits additionally represent synchronizing words, the rectangular arrays of bits representing the synchronizing words being the rectangular arrays of bits located in each row closest to the edge of at least one of the digital soundtracks.

22. The motion picture film according to claim 17, wherein the rectangular arrays of bits representing each word of the coded digital audio signal each have m bits sequentially arranged in the direction perpendicular to the direction of travel and n bits arranged in the direction of travel.

23. The motion picture film according to claim 22, wherein each word of the coded audio signal is composed of 16 bits, m is 4, and n is 4.

24. The motion picture film according to claim 17, wherein:

the digital audio signal includes signals representing plural channels; and the rectangular arrays of bits in each row represent the words of the signals representing the respective channels, the rows of rectangular arrays of bits being sequentially arranged such that the signals representing the respective channels are cyclically recorded in the direction of travel.

25. The motion picture film according to claim 17, wherein the rectangular arrays of bits additionally include a rectangular array of bits representing an error-detection parity word generated from selected ones of the words of the coded digital audio signal and the rectangular array of bits representing the error-detection parity word and the rectangular arrays of bits representing the words of the coded digital audio signal wherefrom the error-detection parity word is generated are arranged in corresponding positions in consecutive rows.

26. The motion picture film according to claim 25, wherein the error-detection parity word is generated using a cyclic redundancy check code.

* * * * *